June 17, 1930. S. M. O'BRIEN 1,764,578
LIFTING DEVICE AND LOCK FOR AUTOMOBILE HOODS
Filed Sept. 24, 1928
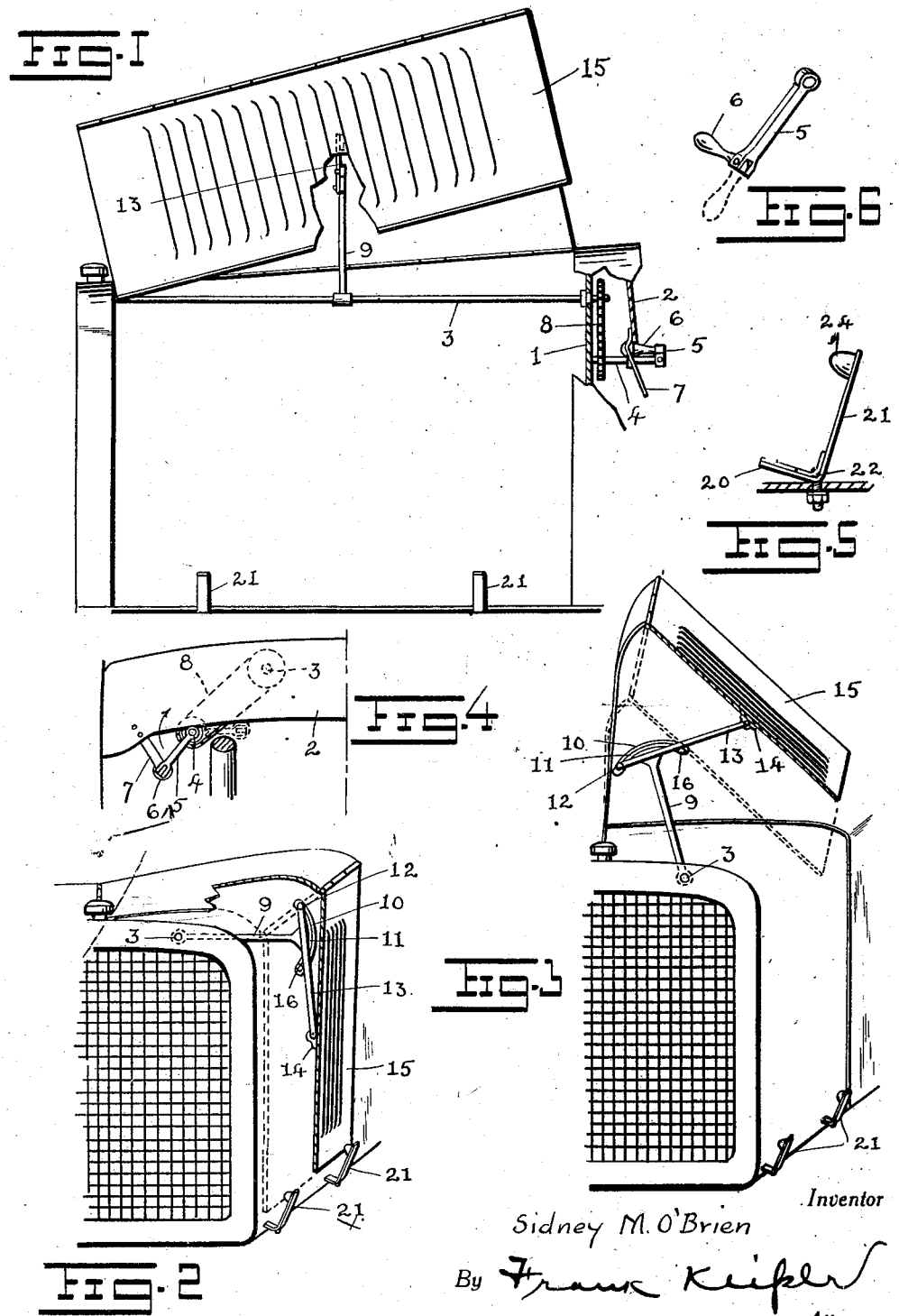

Patented June 17, 1930

1,764,578

UNITED STATES PATENT OFFICE

SIDNEY M. O'BRIEN, OF ROCHESTER, NEW YORK

LIFTING DEVICE AND LOCK FOR AUTOMOBILE HOODS

Application filed September 24, 1928. Serial No. 308,111.

The object of this invention is to provide a new and improved mechanism for lifting either side of a hood of an automobile from the driver's seat, so that the driver will not have to touch the hood itself, and need not soil his hands thereon.

Another object of the invention is to lock the hood in either its raised or in its lowered position.

These and other objects of the invention will be illustrated in the drawing, described in the specification and pointed out in the claims at the end thereof.

In the drawings:

Figure 1 is a side elevation of the mechanism for raising either side of the hood.

Figure 2 is a perspective view showing the hood partly raised, the hood being viewed from the front.

Figure 3 is a perspective view showing the hood in raised position.

Figure 4 shows the dash and operating lever as viewed from the driver's seat.

Figure 5 is a detailed view of the latch for fastening the hood in place when in its lowest position.

Figure 6 is a detailed view of the crank and handle.

In the drawing reference numeral 1 indicates the dash and 2 indicates the instrument board. In the dash is mounted a main shaft 3 and a jack shaft 4. The jack shaft has a crank 5 on the end thereof and a handle 6 mounted thereon by which it is turned. The end of the crank 5 is forked and the handle 6 is pivotally mounted in the fork. When the hood is raised, the handle 6 is placed in the dotted line position, shown in Figure 4 locking the hood up, and when the hood is down, the handle 6 is placed in the full line position shown in Figure 4 where it is out of the way. In this full line position it engages with the latch 7 which is attached to the instrument board by which the handle is held down and the crank is locked in that position locking the hood down.

The shaft 3 and the jack shaft 4 each have a sprocket wheel keyed therein which are connected by a sprocket chain 8 by which the shaft 3 is turned by the jack shaft 4.

Keyed on the shaft 3 is an arm 9 on the end of which is carried a quadrant 10. This quadrant has a slot 11 therein which is curved and extends through an arc of about 90 degrees. The radius of the quadrant is much shorter than the arm 9. A pin 12 engages in this slot and can be clamped in any position desired along the slot. On this pin is pivoted a link 13 which is fastened to the bracket 14 which in turn is fastened to the hood 15. On the lower end of the quadrant 10 is provided a lug 16 which engages under the link 13 after the arm 9 is raised to the position shown in Figure 2.

When the arm 9 is in approximately the horizontal position shown in Figure 2 the lug 16 engages the link 13 and thereafter the link 13 ceases to swing on the pin 12 as a center, but swings around the shaft 3 as a center, its position being fixed by the lug 16 and pin 12. The lug 16 is adjustable in the slot to vary the position of the link 13 and the throw of the hood. The relative movement between the arm 9 and the link 13 is to permit the hood to settle to its proper position at the bottom independently of the lifting mechanism and permit it to be lifted and lowered without striking the fender.

When the lifting mechanism is operated, the hood is first lifted to the position shown in Figure 2 up to which point the hood and link swing freely from the pin 12, but thereafter the lug 16 engages the link and causes the link to swing the hood out and up to the position shown in Figure 3. When the hood reaches the position shown in Figure 3 the handle 6 is turned under the instrument board as shown in dotted lines in Figure 4 and this locks the hood in raised position. The handle turns up in front of the instrument board as it moves in either direction to raise or lower the hood. This makes it possible for it to hold the hood in raised position when the hood is up.

When the hood is lowered the lower edge of the hood engages the short arm 20 of the bell crank 21 pivoted at 22 on the frame of the car. This causes the long arm 23 to swing in sideways against the hood and the rubber pad 24 thereon presses against the hood and pushes it to place against the radiator and other fixed parts of the car structure and holds it there. A rubber pad is provided on the arm 20 so as to cushion the contact between it and the bottom of the hood. This prevents noise and vibration.

By reversing the position of the parts from right to left, the same mechanism can be used to operate the other half of the hood so that either or both sides of the hood can be lifted by the mechanism installed in the car.

I claim:

1. A lifting device for an automobile hood comprising a shaft, an arm on said shaft, a pin thereon, a link pivotally mounted on said pin at one end and pivotally connected to the hood at the other end, a lug on said arm adapted to engage the link at some distance from the pin and cause the link to swing with the arm in a fixed angular relation thereto to raise the link and hood above the arm.

2. A lifting device for an automobile hood comprising a shaft, an arm on said shaft, a pin thereon, a link pivotally mounted on said pin at one end and pivotally connected to the hood at the other end, a lug on said arm adapted to engage the link at some distance from the pin and cause the link to swing with the arm in a fixed angular relation thereto to raise the link and hood above the arm, means for locking the arm, link and hood in such raised position.

3. A lifting device for an automobile hood comprising a main shaft, a jack shaft with gearing between them so that the main shaft is driven from the jack shaft, a crank and a handle pivotally mounted on the jack shaft, an arm on said main shaft, connections between the arm and the hood by which the hood is lifted on the movement of the crank and handle, said handle being adapted to engage under the instrument board by being turned on its pivot, said handle serving when so engaged to hold the hood in raised position.

4. A lifting device for an automobile hood comprising a main shaft, a jack shaft with gearing between them so that the main shaft is driven from the jack shaft, a crank and a handle pivotally mounted on the jack shaft, an arm on said main shaft, connections between the arm and the hood by which the hood is lowered on the movement of the crank and handle, a latch adapted to engage the handle and hold the hood down in its lowest position.

5. A lifting device for an automobile hood comprising a shaft, an arm on said shaft, a quadrant on said arm having a slot therein, a pin adjustably mounted in said slot at one end thereof, a lug adjustably mounted in said slot at the other end thereof, a link pivotally mounted on said pin at one end and pivotally connected to said hood at the other end, said lug being adapted to engage the link at some distance from the pin and cause the link to swing with the arm in a fixed angular relation thereto to raise the link and hood above the arm.

In testimony whereof I affix my signature.

SIDNEY M. O'BRIEN.